United States Patent
Korn

(10) Patent No.: US 6,490,074 B1
(45) Date of Patent: *Dec. 3, 2002

(54) PROCESS FOR FABRY-PEROT FILTER TRAIN CONFIGURATION USING DERIVED MODE FIELD SIZE

(75) Inventor: Jeffrey A. Korn, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/068,258

(22) Filed: Feb. 6, 2002

Related U.S. Application Data

(63) Continuation of application No. 09/809,667, filed on Mar. 15, 2001, now Pat. No. 6,377,386.

(51) Int. Cl.$^7$ .............................. G02F 1/03; G02F 1/07; H01S 3/10
(52) U.S. Cl. ......................................... 359/260; 372/20
(58) Field of Search ................................. 359/260–263, 359/291, 317–320; 356/519; 372/20

(56) References Cited

U.S. PATENT DOCUMENTS

| | | | | |
|---|---|---|---|---|
| 5,212,584 A | * | 5/1993 | Chung et al. ............... | 359/260 |
| 6,141,361 A | * | 10/2000 | Mears et al. ................. | 372/20 |
| 6,204,790 B1 | * | 3/2001 | Hellman et al. ............ | 359/578 |

* cited by examiner

Primary Examiner—Jordan Schwartz
Assistant Examiner—William Choi
(74) Attorney, Agent, or Firm—Grant Houston

(57) ABSTRACT

A process for configuring a tunable MOEMS filter train comprises determining a spectral response of a MOEMS tunable filter. A spectral separation between different order modes, or free spectral range, is then determined for the filter. This information is then related to a mode size of a desired mode of the tunable filter. With this information, lenses for the optical train are provisioned, and then installed so that light is launched into the optical filter at the desired mode size to thereby maximize the SMSR of the filter train.

14 Claims, 4 Drawing Sheets

PROCESS FOR FABRY-PEROT FILTER TRAIN CONFIGURATION USING DERIVED MODE FIELD SIZE

This application is a continuation of U.S. application Ser. No. 09/809,667 filed Mar. 15, 2001 now U.S. Pat. No. 6,377,386.

BACKGROUND OF THE INVENTION

Tunable optical filters are useful in situations requiring spectral analysis of an optical signal. They can also be used, however, as intra-cavity laser tuning elements or in tunable detectors, for example. One of the most common, modem applications for these devices is in wavelength division multiplexing (WDM) systems. WDM systems transmit multiple spectrally separated channels through a common optical fiber. This yields concomitant increases the data throughput that can be obtained from a single optical fiber. There are additional advantages associated with the ability to use a single fiber amplifier to amplify all of the channels on an optical link and its use as a platform for dynamic channel/wavelength routing.

Tunable filters that operate in these WDM systems must typically be high quality/high finesse devices. Currently proposed standards suggest channel spacings of 100 Giga-Hertz (GHz) to channel spacings as tight as 50 GHz in the ITU grid; some systems in development have spacing of 20 GHz and less. Tunable filter systems that operate in systems having such tight channel spacings must have correspondingly small passbands when operating as monitors, receivers, and routing devices.

Typically, the design of the tunable filters is based on a class of devices generally referred to as Fabry-Perot (FP) etalons. These devices have at least two highly reflective elements defining the Fabry-Perot cavity. The tunability functionality is provided by modulating the optical length of the cavity.

Since these tunable filters are typically incorporated into larger systems offering higher levels of functionality and because the Fabry-Perot cavity must be modulated over distances corresponding to the wavelength of light that it is filtering, typically around 1,000 to 2,000 nanometers (nm) in wavelength, microoptical electromechanical systems (MOEMS) technology is typically used to fabricate the tunable filters. The most common implementation pairs an electrostatically-deflectable reflective optical membrane with a fixed reflector. Thin film technology is typically used to obtain the reflectivity. High finesse systems can require dielectric mirrors having greater than seven layers.

A common metric for characterizing the quality of tunable filter systems is the side mode suppression ratio (SMSR). This is the ratio between the magnitude of the lowest order mode in the spectral plot of the filter's characteristic and the magnitude of the next largest mode, which is typically the next higher order mode.

A general configuration for MOEMS tunable filter Fabry-Perot cavities is termed a curved-flat cavity. In such cavities, one of the reflectors is near planar and the other reflector is curved. If the curved reflector has a spherical profile, the cavity is sometimes referred to as a hemispherical cavity.

When hemispheric tunable filters are used, for example, the optical train surrounding the filter must be designed with the objective to control SMSR.

One solution to controlling SMSR used in some conventional MOEMS filter systems is to integrate the tunable filter into the larger optical system by locating it between two fiber pigtails; one fiber pigtail emits the optical signal to be filtered and the other fiber pigtail collects the filtered optical signal after its transmission through the tunable filter. The tunable filter is oriented to be orthogonal to the axis extending between the fiber endfaces.

SUMMARY OF THE INVENTION

As optical systems are developed that allow for higher levels of functionality in a single package, increased attention is directed to the co-design of the tunable filter element and surrounding optical system. This is especially true in systems utilizing free-space-interconnects between the tunable filter and other optical components in the system.

One parameter that affects the SMSR of a MOEMS filter system is mode size matching between the lowest order transverse mode of the tunable filter and the mode size of the light as it is launched into the tunable filter. The mode field diameter is a measure of the radial intensity distribution of radiation. Mode field diameter is measured by the ITU-T reference test method based on the far field scan technique. The intensity of the radiation reaching the photodiode is recorded as a function of angle; and from these data, the mode field diameter is calculated. According to one definition, weighted mean of the angular radial intensity distribution is used. If the mode size of the light that is launched into the filter is smaller or larger than the lowest order mode of the filter, higher order modes will be excited, thereby degrading the performance of the system.

The spectral output of a Fabry-Perot filter, in general, comprises multiple spectrally distributed peaks in the filter's response to a broadband light source. These different peaks are attributable to the longitudinal mode orders of operation of the cavity and the cavity's transverse spatial modes. The pattern of the peaks repeats itself spectrally with a periodicity that is related to the separation between the mirrors, termed the free spectral range. Within a given order of longitudinal mode operation, the frequency separation between transverse modes is related to the curvature of the mirrors. Specifically, for Hermite-Gaussian transverse modes the spectral separation between the lowest-order mode and any higher-order mode with mode number (n,m) are given by:

$$\Delta v_{HOM} = (n+m+1)\arccos\left[\text{sqrt}\left(1-\frac{L}{r_1}\right)\cdot\text{sqrt}\left(1-\frac{L}{r_2}\right)\right]c/(2\pi L)$$

$$= (n+m+1)\arccos[\text{sqrt}(g_1+g_2)]\cdot\frac{c}{2\pi L} \text{ where } g_1$$

$$= 1-L/r_1 \text{ and } g_2 = 1-L/r_2, \text{ where } rl$$

and r1 are the radii of curvature of the two mirrors and L is the mirror separation.

Typically, one of the mirrors will have a known radius of curvature, for example, in a curved-flat cavity. Such information can be determined using white-light interferometery or other surface profilometry. The other mirror's radius can thus be computed.

This scheme is useful in the situation where the known mirror has a relatively small radius, and thus can be measured accurately. When the second mirror has a very long radius, it is difficult to measure its radius, especially if its effective aperture is small.

The present invention is directed to a technique for determining the mode size of a MOEMS tunable Fabry-Perot filter by reference to a calculated value for the curvatures of the reflectors that form the Fabry-Perot tunable filter cavity. Specifically, in the case of a concentric Fabry-Perot cavity or related cavity where one of the mirrors is relative flat, the curvature of the curved reflector is calculated from the spectral response of the tunable filter.

In general, according to one aspect, the invention features a process for configuring a tunable MOEMS filter train. The process comprises determining a spectral response of a MOEMS tunable filter. A spectral separation between different order longitudinal modes, or free spectral range, is then determined for the filter, as well as transverse mode spectral separation. This information is then related to a mode size of a desired mode of the tunable filter. With this information, lenses for the optical train are provisioned, and then installed so that light is launched into the optical filter at the desired mode size to thereby maximize the SMSR of the filter train.

In specific embodiments, the mode size of the injected optical signal is determined for the filter train. In the case of light being launched from a single mode optical fiber, the mode size is about 8–10 micrometers in diameter.

In one implementation, the spectral response of the tunable filter can be determined by tuning the tunable filter across a laser light source or other source that generates a spectrally narrow line. In another implementation, the filter spectral response is determined by injecting broadband "white" light into the filter and measuring the transmitted light spectrum.

According to other aspects of the preferred embodiment, the step of determining the spectral separation comprises determining a spectral separation between a lowest order mode and a next higher order mode within an order of operation of the tunable filter. Using this information, lenses in the optical train are selected to have beam forming characteristics that will yield the desired mode size at the tunable filter. These provisioned lenses are then installed in the filter train.

According to another implementation, the location of the lenses in the filter train can be adjusted to achieve the desired mode size at the tunable filter.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
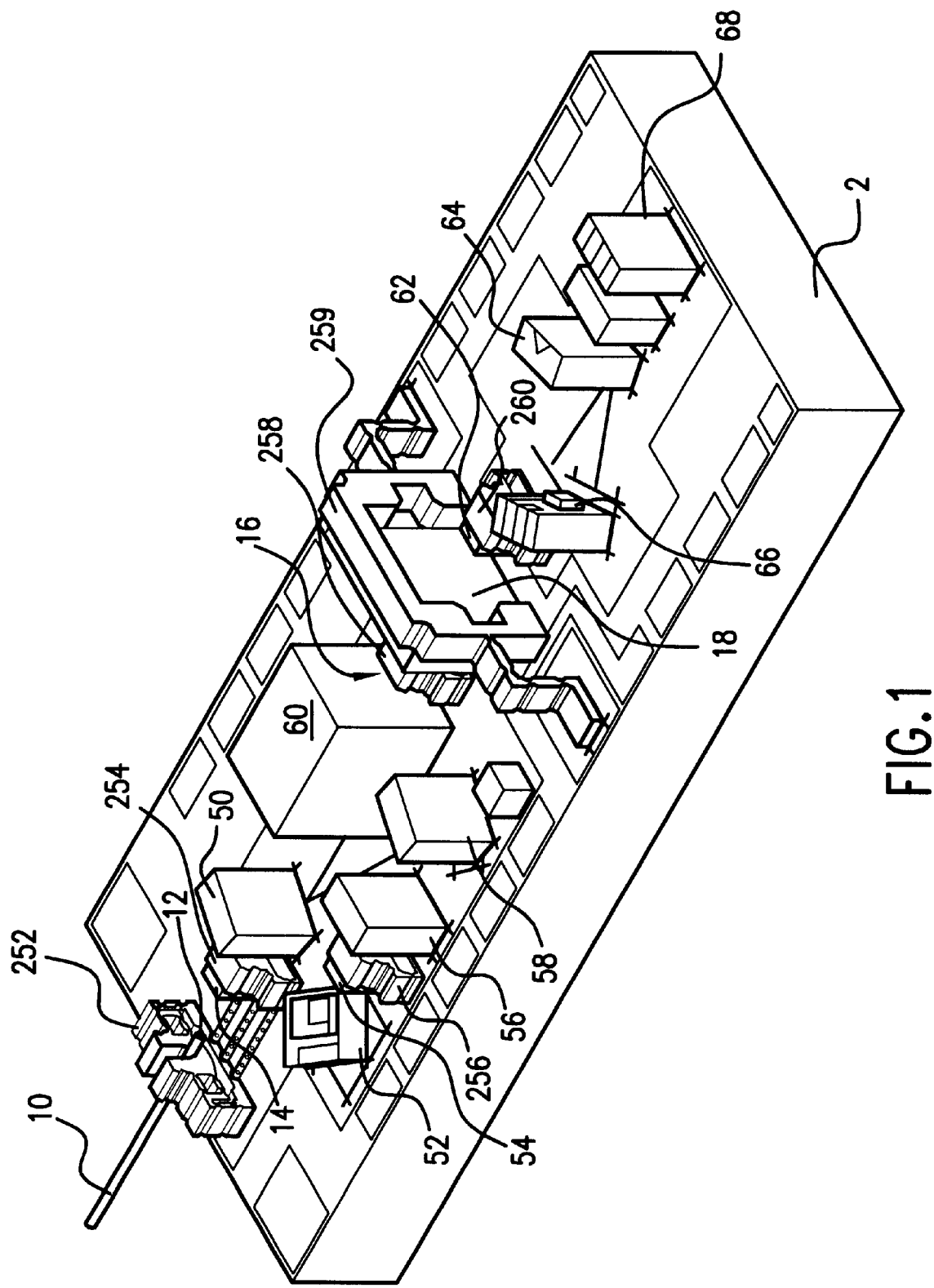
FIG. 1 is a perspective view of an optical channel monitor to which the present invention is applicable, in one example.

FIG. 1 illustrates the integration of the optical channel monitoring system on a single, miniature optical bench 2.

Specifically, the fiber 10 is terminated on the bench 2 at a mounting and alignment structure 252. This mounting and alignment structure 252 holds the fiber in proximity to a first collimating lens 14, which is held on its own mounting and alignment structure 254. The first collimating lens forms a signal beam that is transmitted through an optional isolator 60.

After the isolator, a focusing lens 16 focuses the beam onto a tunable MOEMS filter 18, which is held on the filter mounting and alignment structure 259.

In one implementation, a reference signal optical train is further provided. Specifically, a super luminescent light emitting diode (SLED) 52 generates the broadband beam, which is focused by the second collimating lens 54 held on mounting and alignment structure 256. This collimates the beam to pass through the etalon 56 installed on the bench 2. A reference beam generated by the etalon is reflected by fold mirror 58 to a first WDM filter 50 in the signal beam path. As a result, a combined beam is transmitted through the isolator 60 and the tunable filter.

The filtered, combined beam from the filter 18 is re-collimated by a third collimating lens 62 held on mounting and alignment structure 260. This beam is then separated into the filtered reference beam and the filtered signal beam by a second WDM filter 64. The reference signal is detected by reference photodiode 66. The filtered optical signal is transmitted through the second WDM filter 64 to the signal photodiode 68.

Figure 2:
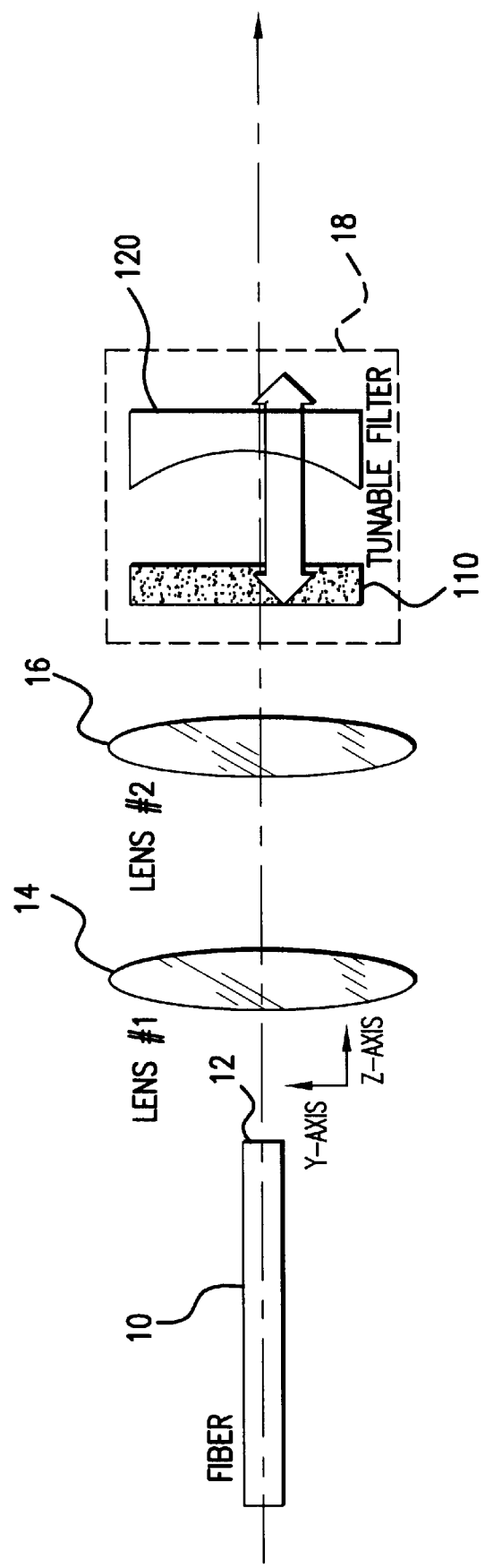
FIG. 2 is a schematic block diagram showing a tunable filter train according to the present invention.

FIG. 2 is a schematic diagram of the portion of the filter train for the tunable that defines the launch criteria for the optical signal into the tunable filter and thus, the filter's and system's SMSR. Specifically, the fiber 10 is preferably single mode. It launches the optical signal in the form of a beam into the first lens 14. This generally improves the collimation of the beam or forms a beam waist between the first lens 14 and the second lens 16. In the preferred embodiment, the focal lengths of the first and second lenses are between 1.0 and 2.0 millimeters. In a current implementation, the focal length of the first lens 14 is about 1100 $\mu$m and of the second lens is about 1600 $\mu$m. The spacing between the first lens and the fiber endface is less than 1.0 millimeter, or presently about 500 $\mu$m. The spacing between the first lens 14 and of second lens 16 is between 2 and 10 mm, presently it is about 6 mm. Finally, the spacing between the second lens and the reflecting membrane 110 of the tunable filter 18 is between 0.5 and 3 mm. Presently, it is about 1 mm. In the current implementation, the membrane 110 is silicon and the curved reflector 120 is silicon or gallium phosphide.

With these parameters, the nominal magnification of the tunable filter train, comprising lenses 14, 16, is two. Generally, the magnification should be between 1 and 5. Thus, the 10 micrometer diameter mode size emitted from the endface 12 of the fiber 10 is converted to a 20 micrometer beam diameter at the tunable filter 18. Generally, the mode field diameter of the lowest order mode for the filter is between 10 and 50 micrometers.

Figure 3:
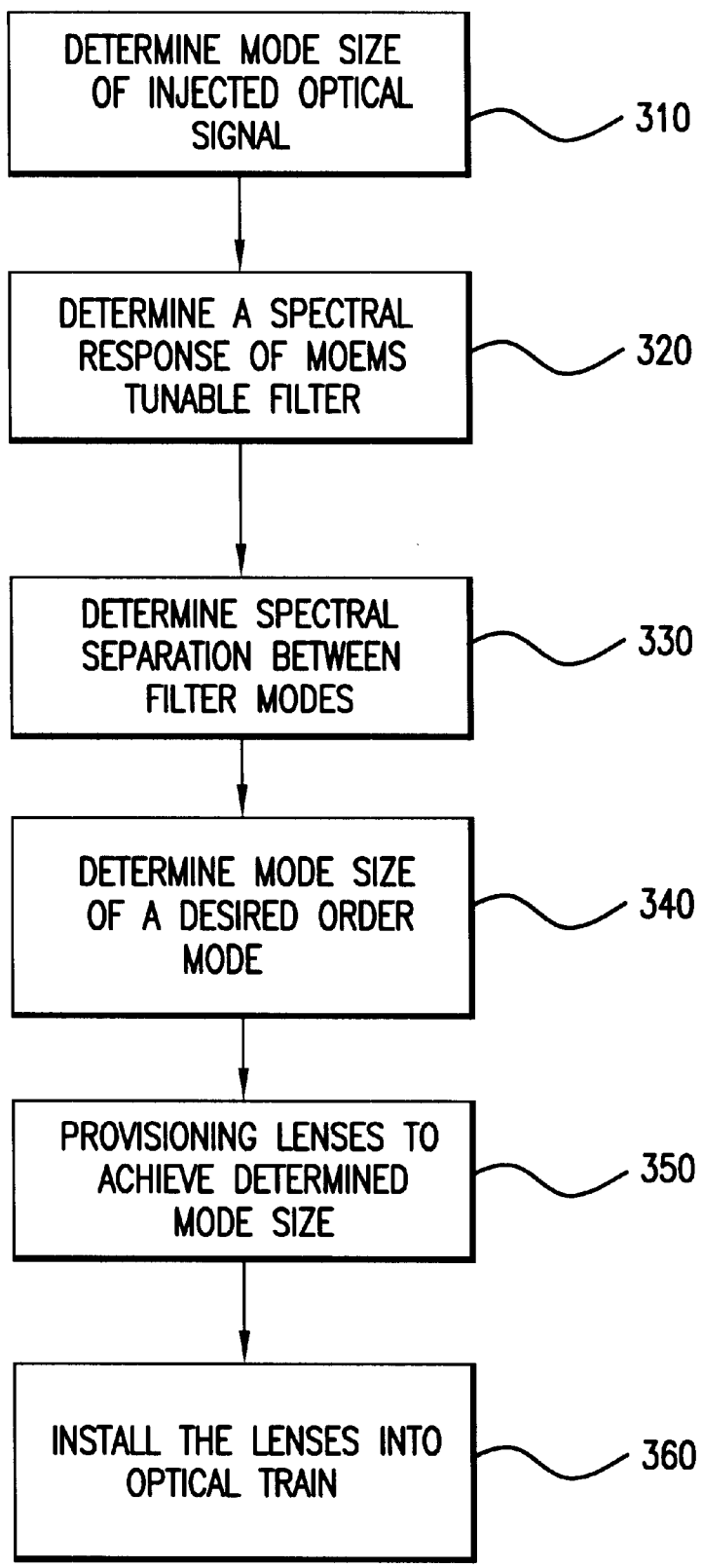
FIG. 3 is a process diagram illustrating the inventive tunable filter train configuration process for mode field diameter matching.

FIG. 3 shows the process for configuring the tunable filter train according to the present invention. Specifically, the mode size of the injected signal is determined in step 310. Specifically, this mode size is approximately 8–10 micrometers in the current embodiment, which is the typical mode size in single mode fiber for wavelengths surrounding 1,550 nm.

Figure 4:
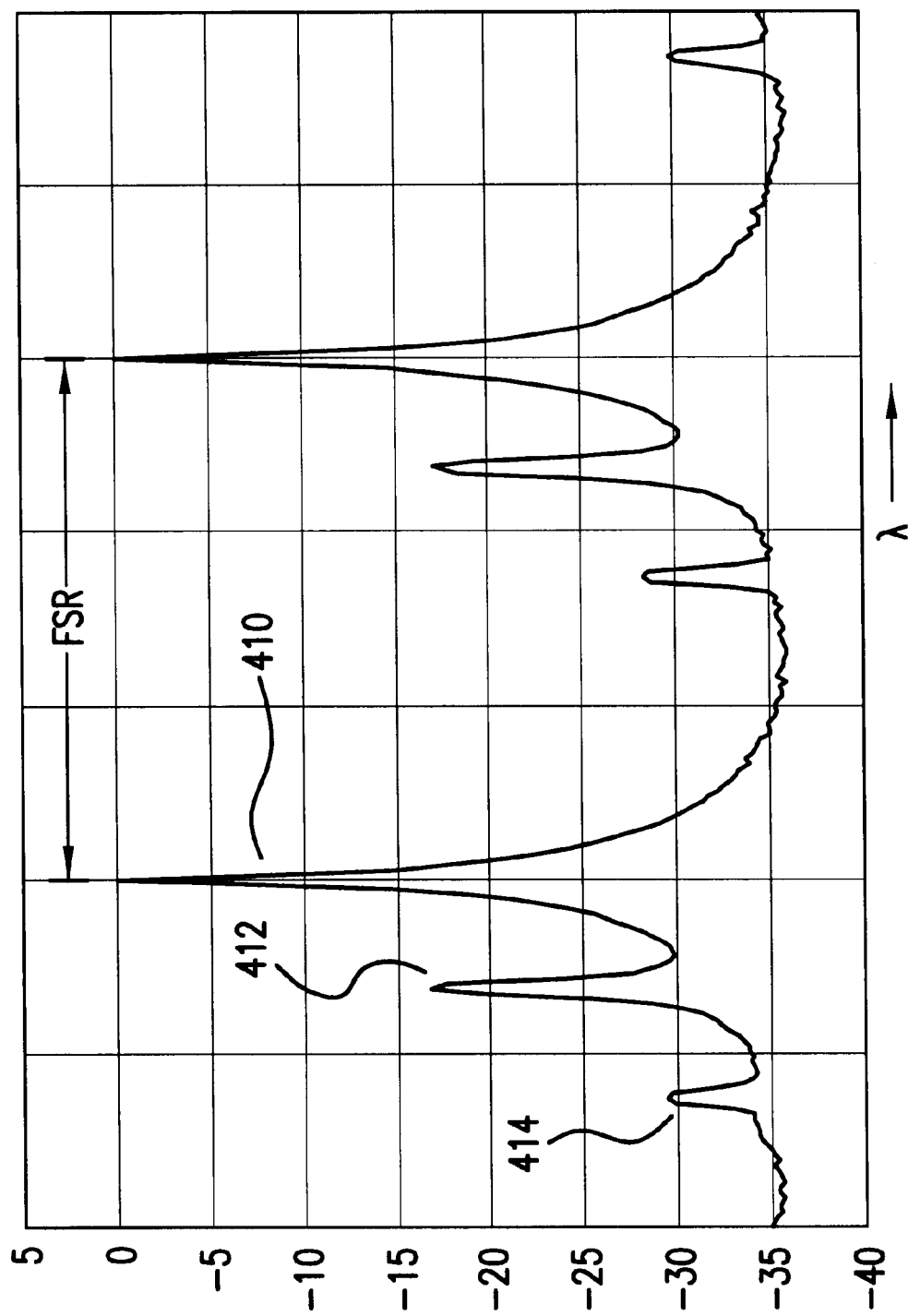
FIG. 4 is a spectral plot showing a lowest order mode and a next higher order mode within an order of operation of the tunable filter.

Also, in step 320, the spectral response of the MOEMS tunable filter is determined. In one implementation, a signal from a laser source or other narrow-band signal is injected into the MOEMS tunable filter 18, while the tunable filter is scanned across the signal. Thus, the temporal response is roughly equivalent to the filter's spectral response. Exemplary spectral plot is illustrated in FIG. 4. Within the illustrated order of operation, there is a lowest order mode 410, higher order satellite modes 412, 414 that are attributed to the transverse spatial modes of the FP cavity.

Next, in step 330, the spectral separation between the filter modes is determined. Specifically, the nanometer separation between mode 410 and mode 412 in FIG. 4 is determined in the preferred embodiment, since these are typically the highest power modes in the signal. Additionally, in the preferred embodiment, the free spectral range of the filter is determined. This is the spectral separation between the different orders of the filter operation, which correspond to the different longitudinal modes of the filter cavity.

Next, the desired mode size is determined in step 340. Specifically, the following set of calculations are used to determine that mode size in one embodiment in which, the mirror 120 is gallium phosphide (GaP), the membrane 110 is silicon, and the free spectral range is 76 nanometers.

Note: All Dimensions in Microns.

Based on the measured HOM spacing (the odd mode-fundamental), deduce the g1g2 product to calculate the radius of curvature of the Mems Membrane 110. Then, determine the mode-matched spot sized launched from either the Si or the GaP side.

$R_{GaP}$:=−1055 Negative value of R is for concave mirror (as beam sees it)

$\lambda$:=1.559034 $\mu$m Fundamental wavelength $\lambda_{next}$:=1.635102 $\mu$m Next order wavelength $\lambda_{odd}$:=$\lambda$−0.003388 $\mu$m FSR (nm)

$$\Delta v := \frac{c}{\lambda} - \frac{c}{\lambda_{next}} \quad \Delta v = 8.946 \times 10^{12} \text{ Hz} \quad (\lambda_{next} - \lambda) \cdot 1000 = 76.086 \ \mu m$$

$$L := \left| \frac{c}{2 \cdot \Delta v} \right| \quad L = 16.756 \ \mu m$$

$$\Delta v_{HOM} := \frac{c}{\lambda_{odd}} - \frac{c}{\lambda} \quad \Delta v_{HOM} = 4.191 \times 10^{11} \text{ Hz}$$

$$g_1 := \frac{\left(\cos\left(\Delta v_{HOM} \cdot 2 \cdot L \frac{\pi}{c}\right)\right)^2}{1 + \frac{L}{R_{GaP}}}$$

$$R_{mems} := \frac{L}{g_1 - 1}$$

$R_{mems}$:=2949 $\mu$m (radius of curvature of silicon membrane 110)

Calculate beam diameters at mirrors for a spherical resonator, then determine the optical launch condition from either Si or GaP side L:=16.756 $\mu$m $R_{mems}$:=−2948.9 $\mu$m$\lambda$:=1.559034 $\mu$m $R_{GaP}$:=−1055 $\mu$m $$z_1 := \frac{-L(R_{mems} + L)}{R_{mems} + R_{GaP} + 2 \cdot L} \quad z_1 = -12.374 \quad \text{position of mirror 1 wrt beam waist at } z = 0$$

$$z_2 := z_1 + L \quad z_2 = 4.382 \quad \text{position of mirror 2 wrt beam waist at } z = 0$$

$$z_0 := \sqrt{\frac{-L \cdot (R_{GaP} + L) \cdot (R_{mems} + L) \cdot (R_{mems} + R_{GaP} + L)}{(R_{mems} + R_{GaP} + 2 \cdot L)^2}}$$

rayleigh range, beam radius is sqrt (2) larger than waist here, $2z_0$ = depth of focus $$w_0 := \sqrt{\lambda \cdot \frac{z_0}{\pi}} \quad w = 7.508 \text{ waist radius}$$

$$w_1 := w_0 \cdot \left[1 + \left(\frac{z_1}{z_0}\right)^2\right]^{\frac{1}{2}} \quad w_1 = 7.552 \text{ spot radius at mirror 1}$$

$$w_2 := w_0 \cdot \left[1 + \left(\frac{z_2}{z_0}\right)^2\right]^{\frac{1}{2}} \quad w_2 = 7.513 \text{ spot radius at mirror 2}$$

Spot size at curved mirror=$2 \cdot w_1$=15.105 μm=spot diameter at $1/e^2$ power Spot size at flat mirror=$2 \cdot w_2$=15.027 μm Calculate the optimum launch condition for mode—matching to either side.

Calculate the required spot size in air since we can measure it directly.

Launching from the GaP Mirror n:=3.052 L:=200

$r_c$:=$R_{GaP}$ $W_c$:=$W_1$ $$q_2 = \left[\left(\frac{1}{r_c} - \frac{i \cdot \frac{\lambda}{n}}{\pi \cdot w_c^2}\right)^{-1}\right]$$

$q_2$=−105.021+315.86i $$q_{0im} := \text{Im}\left(\frac{q_2 - L}{n}\right) \quad q_{0re} := \text{Re}\left(\frac{q_2 - L}{n}\right) \quad q_{0im} = 103.493$$

$q_0$:=$q_{0re}$+i·$q_{0im}$  $q_{0re}$:=−99.941

The radius of curvature and spot entering the GaP Mirror are $$R_{in} := \frac{1}{\text{Re}\left(\frac{1}{q_0}\right)} \quad R_{in} = -207.112$$

$$w_{in} := \sqrt{\frac{-\lambda}{\pi} \cdot \frac{1}{\text{Im}\left(\frac{1}{q_0}\right)}} \quad 2w_{in} = 19.925$$

Therefore, the spot size at the waist in air is $$w_0 := \frac{w_{in}}{\sqrt{1 + \left(\frac{\pi \cdot w_{in}^2}{\lambda \cdot R_{in}}\right)^2}} \quad 2w_0 = 14.333$$

Launching from Si Membrane side n:=3.4 L:=7

$r_c$:=$R_{mems}$ $W_c$:=$W_2$ $$q2 := \left[\left(\frac{1}{r_c} - \frac{i \cdot \frac{\lambda}{n}}{\pi \cdot w_c}\right)^{-1}\right]$$

q2=−49.869+380.227i $$q_{0im} = := \text{Im}\left(\frac{q_2 - L}{n}\right) \quad q_{0re} := \text{Re}\left(\frac{q_2 - 1}{n}\right) \quad q_{0im} = 111.831$$

$q_0$:=$q_{0re}$+i·$q_{0im}$  $q_{0re}$=−16.276

The radius of curvature and spot entering the Si Membrane are $$R_{in} := \frac{1}{\text{Re}\left(\frac{1}{q_0}\right)} \quad R_{in} := -764.433$$

$$w_{in} := \sqrt{\frac{-\lambda}{\pi} \cdot \frac{1}{\text{Im}\left(\frac{1}{q_0}\right)}} \quad 2w_{in} = 15.065$$

$w_{in}$ = 7.532

Therefore, the spot size at the waist in air is $$w_0 := \frac{w_{in}}{\sqrt{1 + \left(\frac{\pi \cdot w_{in}^2}{\lambda \cdot R_{in}}\right)^2}} \quad 2w_0 = 14.899$$

$w_0$ = 7.45

Once the desired mode size for the tunable filter 18 is determined, then the lenses of the filter train are selected and their position is determined in step 350.

Specifically, according to the illustrated embodiment, there are two lenses in the filter train: the first lens 14 and the second lens 16. These yield an effective magnification between the mode size at the fiber endface 12 and the tunable filter 18.

Lenses of established curvatures can be used. The positioning of the lenses in train between the fiber endface and the tunable filter is adjusted to yield the preferred mode size at the tunable filter.

Finally, in step 360, the lenses are installed in the filter train having the selected curvatures and locations between the fiber endface 12 and the tunable filter 18.

A further extension of above described techniques is to measure mirrors. Mirror astigmatism is manifested in the spectral plot of the filtering function by peak splitting in the higher order modes. Measurement of the spectral distance between these sub-peaks is related to the astigmatism in the mirror, or specifically the two radii of curvatures.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for configuring a tunable MOEMS filter train, the process comprising:
    determining a spectral response of a MOEMS tunable filter;
    determining a spectral separation between different modes in the spectral response of the tunable filter;
    determining a mode size of a desired mode of the tunable filter from the spectral separation; and
    selecting and installing an optical component in response to the determined mode size into an optical train of the tunable filter to launch light into the tunable filter.

2. A process as claimed in claim 1, further comprising determining a mode size of an optical signal injected into the filter train.

3. A process as claimed in claim 1, wherein a mode size of an optical signal injected into the filter train is about 10 micrometers in diameter.

4. A process as claimed in claim 1, further comprising injecting an optical signal into the filter train directly from a single mode optical fiber.

5. A process as claimed in claim 1, wherein the step of determining the spectral response of the tunable filter comprises scanning the tunable filter across a laser light source.

6. A process as claimed in claim 1, wherein the step of determining the spectral response of the tunable filter comprises scanning the tunable filter across a spectrally narrow line.

7. A process as claimed in claim 1, wherein the step of determining the spectral separation between the different modes in the spectral response of the tunable filter comprises determining the spectral separation between a lowest order mode and a next higher order mode within an order of operation of the tunable filter.

8. A process as claimed in claim 1, wherein the step of determining the mode size comprises determining the mode size of a lowest order mode of the tunable filter.

9. A process as claimed in claim 1, wherein the step of selecting and installing the optical component comprises selecting a lens having beam forming characteristics that will yield the determined mode size at the tunable filter.

10. A process as claimed in claim 1, wherein the step of selecting and installing the optical component comprises determining the beam forming characteristics of the optical component and determining a position for the optical component that will yield the determined mode size at the tunable filter.

11. A process as claimed in claim 1, wherein the step of selecting and installing the optical component comprises determining the beam forming characteristics of the optical component and installing the optical component to provide a mode field diameter of between 10 and 50 micrometers at the tunable filter.

12. A tunable MOEMS filter train, comprising:

a MOEMS tunable filter having a spectral response, in which a spectral separation between different modes in the spectral response has been measured and a mode size of a desired mode of the tunable filter determined; and an optical component that launches an input signal into the tunable filter, the optical component being selected and/or placed so that the input signal has the determined mode size at the tunable filter.

13. A filter train as claimed in claim 12, wherein the optical component comprises a lens.

14. A filter train as claimed in claim 12, wherein the determined mode size is between 10 and 50 micrometers.

* * * * *